United States Patent Office 3,457,330
Patented July 22, 1969

3,457,330
MOLDING COMPOSITION COMPRISING POLY-VINYLCHLORIDE, ETHYLENE-VINYL ACETATE COPOLYMER, AND POLYETHYLENE
Robert Buning, Oberlar, Germany, assignor to Dynamit Nobel Aktiengesellschaft, Troisdorf, Bezirk Cologne, Germany
No Drawing. Continuation of application Ser. No. 403,401, Oct. 12, 1964. This application Jan. 6, 1967, Ser. No. 607,852
Claims priority, application Germany, Oct. 12, 1963, D 42,688
Int. Cl. C08f 29/24, 29/04
U.S. Cl. 260—897                                    6 Claims

ABSTRACT OF THE DISCLOSURE

Polyvinylchloride polymer having high impact strength comprising 0.5–15 wt. percent of copolymer vinyl acetate and ethylene (based on the weight of the polyvinylchloride polymer), said copolymer containing about 10–70 wt. percent of vinyl acetate and having a relative viscosity of about 1.8–4, and about 5–80 wt. percent polyethylene (based on the weight of said copolymer) of molecular weight about 100,000–200,000 and density of about 0.93–0.98.

---

This application is a continuation of application Ser. No. 403,401, filed Oct. 12, 1964, now abandoned.

It is in the prior art to improve the mechanical properties of polyvinylchloride by the addition of copolymers of vinyl acetate and ethylene. In particular, this binary plastic mixture exhibits an improved U-notch impact strength. To achieve high U-notch impact strength, it is necessary to add the above-mentioned copolymers in relatively large amounts, resulting in a great impairment of other properties. Furthermore, the addition of more than 15% of the above-mentioned copolymers is undesirable for economic reasons.

It has now been found that, for the manufacture of molded articles of high impact strength, it is possible with special advantage to use molding substances on a basis of polyvinylchloride, which comprise a ternary plastic mixture of polyvinylchloride polymer, about 0.5 to 15 wt. percent copolymers (based on the polyvinyl chloride) of vinyl acetate and ethylene containing at least about 10, but no more than about 70 wt. percent, of vinyl acetate, and having a relative viscosity (measured in chloroform at 20° C.) of about 1.8–4, and polyethylene, preferably in amounts of from 5 to 80 wt. percent (based on the weight of copolymer), expediently in highly crystalline form, with a molecular weight of at least 100,000, especially 200,000, and a density of about 0.93–0.98, preferably about 0.935–0.97. Said percentages are with reference to the copolymer.

If desired, stabilizers, lubricants and plasticizers can be added to the molding substances.

By molded articles are meant, for example, molded bodies, sheets and the like, as can be produced by casting, rolling, calendering, extruding, etc., in conventional ways.

The polyvinylchloride can be replaced in the ternary plastic mixture by its copolymers or its derivatives, such as for example post chlorinated polyvinylchloride.

Examples of suitable copolymers are those of vinyl chloride with vinyl acetate, vinyl propionate, vinyl stearate, itaconic acid dimethylester, maleic acid diethylester, fumaric acid diethylester, acrylonitrile, vinylidene chloride, ethylene, propylene, acrylic acid iso-octyl ester and other materials suitable for production of such copolymers. The content of vinyl chloride residue in the copolymer can be about 50–98 wt. percent and is preferably at least about 70–98 wt. percent of the copolymer. The addition of polyethylene results in a substantial increase in the U-notch impact strength, without substantially modifying the other properties. That molded bodies with special properties can be obtained from the molding substances claimed under the invention is surprising, because highly crystalline polyethylene is relatively more brittle than amorphous polyethylene, and hence the more brittle product appears to be a better means of elastification.

EXAMPLES 700 g. of polyvinylchloride (K value 70), 14 g. of 17 M (tin stabilizer), 3.5 g. of A-wax (lubricant, polyethylene oxide with a molecular weight of about 2000), 60 g. of vinyl acetate-ethylene copolymer (relative viscosity 2.8, 60% vinyl acetate), and 30 g. of polyethylene (molecular wt. 200,000, density 0.965) are thoroughly mixed and worked for 20 minutes on the roller at 170° C. into a roller skin. The roller skin, while still hot, is pressed to a 4 mm. plate at 190° C. in 5 minutes.

The mixtures described in the following table are worked in the same manner. In the table, PVC=polyvinylchloride, PE=polyethylene, CP=copolymer of vinyl acetate and ethylene.

| No. | PVC (g.) | CP (g.) | PE (g.) | U-Notch, cm. kp./cm.² [DIN 53453] |
|---|---|---|---|---|
| 1 | 700 | 0 | 0 | 3.5 |
| 2 | 700 | 37 | 0 | 10.5 |
| 3 | 700 | 37 | 6.2 | 47.6 |
| 4 | 700 | 60 | 0 | 13.4 |
| 5 | 700 | 60 | 5 | 57.0 |
| 6 | 700 | 60 | 30 | 53.2 |

It appears from the table that an unexpectedly high U-notch impact strength is achieved by the addition of polyethylene. It is thus possible in this manner to manufacture a polyvinylchloride of high impact strength. The U-notch impact strength for 92–96 weight percent of polyvinylchloride in the ternary mixture can be about 10–60 cm. kilopond/cm.².

It is in the prior art to manufacture polyvinylchloride of high impact strength, by the addition, for example, of butadiene copolymers or of postchlorinated polyethylene to the polyvinyl chloride. The disadvantage of the prior-art processes, however, lies in the difficult workability on the one hand, and on the other hand the amount added is so great that it has an excessively negative effect on the otherwise good properties of the polyvinylchloride.

What is claimed is:

1. A resin composition comprising a vinylchloride polymer containing at least 50% vinyl chloride polymerized therein or the corresponding post-chlorinated polymer, about 0.5–15 wt. percent of copolymer of vinyl acetate and ethylene (based on the weight of vinyl chloride polymer) containing about 10–70 wt. percent vinyl acetate and having a relative viscosity of about 1.8–4, and about 5–80 wt. percent polyethylene (based on the weight of said copolymer) of molecular weight about 100,000–200,000 and density of about 0.93–0.98.

2. A molded body of a resin according to claim 1.

3. A method of producing a molded body of high impact strength which comprises forming a resin composition according to claim 1 into the molded body.

4. A resin composition according to claim 1 and consisting essentially of polyvinylchloride, about 0.5–15 wt. percent of copolymer of vinyl acetate and ethylene (based on the weight of polyvinyl chloride polymer) containing about 10–70 wt. percent vinyl acetate and having a relative viscosity of about 1.8–4, and about 5–80 wt. percent polyethylene (based on the weight of said copolymer of molecular weight about 100,000–200,000 and density of about 0.93–0.98.

5. Molded body of a resin according to claim 4.

6. A method of producing a molded body of high impact strength which comprises forming a resin composition according to claim 4 into the molded body.

References Cited

UNITED STATES PATENTS

| | | |
|---|---|---|
| 3,182,101 | 5/1965 | Rees. |
| 3,085,082 | 4/1963 | Baer et al. |
| 3,046,237 | 7/1962 | Rosenfelder et al. |

OTHER REFERENCES

Modern Plastics Encyclopedia, vol. 36, No. 1A, Ethylene Polymers, pp. 109–112, September 1958.

MURRAY TILLMAN, Primary Examiner

C. J. SECCURO, Assistant Examiner